United States Patent
Juels et al.

(10) Patent No.: US 8,984,609 B1
(45) Date of Patent: Mar. 17, 2015

(54) METHODS AND APPARATUS FOR EMBEDDING AUXILIARY INFORMATION IN ONE-TIME PASSCODES

(75) Inventors: Ari Juels, Brookline, MA (US); Nikolaos Triandopoulos, Arlington, MA (US); Ronald Rivest, Arlington, MA (US); Marten Erik van Dijk, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 123 days.

(21) Appl. No.: 13/404,780

(22) Filed: Feb. 24, 2012

(51) Int. Cl.
*G06F 9/00* (2006.01)

(52) U.S. Cl.
USPC .............................................. 726/9

(58) Field of Classification Search
None
See application file for complete search history.

(56) References Cited

U.S. PATENT DOCUMENTS

| | | | | |
|---|---|---|---|---|
| 5,721,779 A * | 2/1998 | Funk | ............................ | 713/155 |
| 5,754,652 A * | 5/1998 | Wilfong | ........................ | 713/183 |
| 7,096,496 B1 * | 8/2006 | Challener et al. | ............... | 726/17 |
| 7,414,549 B1 * | 8/2008 | Yang et al. | ........................ | 341/50 |
| 7,502,933 B2 * | 3/2009 | Jakobsson et al. | ............. | 713/172 |
| 7,644,281 B2 * | 1/2010 | Deguillaume et al. | ........ | 713/176 |
| 8,060,750 B2 * | 11/2011 | Duane et al. | ................... | 713/182 |
| 2003/0061480 A1 * | 3/2003 | Le et al. | ........................ | 713/153 |
| 2003/0188193 A1 * | 10/2003 | Venkataramappa | .......... | 713/201 |
| 2004/0123116 A1 * | 6/2004 | Jin et al. | ........................ | 713/187 |
| 2004/0264691 A1 * | 12/2004 | Kalker | .............. | 380/1 |
| 2007/0180509 A1 * | 8/2007 | Swartz et al. | ..................... | 726/9 |
| 2007/0208986 A1 * | 9/2007 | Luo et al. | ...................... | 714/752 |
| 2011/0096955 A1 * | 4/2011 | Voloshynovskiy et al. | ... | 382/103 |

OTHER PUBLICATIONS

Vector Quantization, author unknown, found at http://web.archive.org/web/20110301104927/http://www.mqasem.net/vectorquantization/vq.html, Mar. 2011.*

Kangas et al., "Developments and Applications of the Self_Organizing Map and Related Algorithms", MACTOM 41(5-6) Jul. 1996.*

Cheng, et al., "Robust Zero-Redundancy Vector Quantization for Noizy Channels", Proceeding of the IEEE International Conference on Communications, CH2655-9/89/0000-1338 IEEE 1989.*

* cited by examiner

*Primary Examiner* — Peter Poltorak
(74) *Attorney, Agent, or Firm* — Ryan, Mason & Lewis, LLP (57) ABSTRACT

Methods and apparatus are provided for embedding auxiliary information in one-time passcode authentication tokens. Auxiliary information is embedded in authentication information transmitted to a receiver by obtaining the auxiliary information; and mapping the auxiliary information to a codeword using a secret key, wherein the secret key is shared between the security token and an authentication authority; and combining the codeword with a tokencode generated by a security token to generate a one-time passcode. The one-time passcode can then be transmitted to the receiver.

31 Claims, 9 Drawing Sheets

METHODS AND APPARATUS FOR EMBEDDING AUXILIARY INFORMATION IN ONE-TIME PASSCODES

CROSS-REFERENCE TO RELATED APPLICATIONS

The present invention is related to U.S. patent application Ser. No. 13/404,737, entitled "Methods and Apparatus for Authenticating a User Using Multi-Server One-Time Passcode Verification," and U.S. patent application Ser. No. 13/404,788, entitled "Methods and Apparatus for Silent Alarm Channels Using One-Time Passcode Authentication Tokens," each filed contemporaneously herewith and incorporated by reference herein.

FIELD OF THE INVENTION

The present invention relates generally to techniques for secure transmission of messages over a network or other types of communication systems.

BACKGROUND OF THE INVENTION

In order to gain access to applications or other resources via a computer or another user device, users are often required to authenticate themselves by entering authentication information. Such authentication information may comprise, for example, passwords that are generated by a security token carried by a user. These passwords may be one-time passwords that are generated using a time-synchronous or event-based algorithm. One particular example of a well-known type of security token is the RSA SecurID® user authentication token commercially available from RSA Security Inc. of Bedford, Mass., U.S.A.

In most existing token-based user authentication systems, a security token belonging to a user generates a one-time passcode for verification by an authentication server. While the one-time passcodes provide an effective mechanism for authenticating the user, it may be necessary or desirable to communicate additional or auxiliary information with the one-time passcode to the authentication server. For example, such auxiliary information may encompass the physical integrity of the security token, battery-lifetime indicators, or randomly evolving key material. The communication channel by which such auxiliary information is transmitted is referred to as an auxiliary channel that augments the main authentication channel provided by the one-time passcodes.

U.S. Pat. No. 7,502,933, entitled "Identity Authentication System and Method," describes an auxiliary channel construction for authentication tokens. Generally, auxiliary information is embedded in a passcode, yielding a new embedded passcode for display on the security token and transcription by the user. While the disclosed embedding technique provides an effective mechanism for embedding auxiliary information with a passcode, a need remains for improved techniques for encoding the auxiliary information. A further need exists for techniques for encoding the auxiliary information that provides improved resilience to typographical errors when the embedded passcode is transcribed by the user, as well as improved resilience to malicious tampering with the passcodes by an attacker.

SUMMARY OF THE INVENTION

Generally, methods and apparatus are provided for embedding auxiliary information in one-time passcode authentication tokens. According to one aspect of the invention, auxiliary information is embedded in authentication information transmitted to a receiver by obtaining the auxiliary information; and mapping the auxiliary information to a codeword using a secret key, wherein the secret key is shared between the security token and an authentication authority; and combining the codeword with a tokencode generated by a security token to generate a one-time passcode. The one-time passcode can then be transmitted to the receiver. The tokencode can be based on a forward secure pseudo random number.

The mapping step optionally employs a mapping function that maps a given message in a message space to a codeword in a codebook. For example, the codebook can comprise an error-correction code of distance d. The codebook can be generated once for the security token using a secret key, or a codeword can be generated for a given transmission using a secret key. The secret key optionally provides forward security.

The combining step comprises, for example, an addition of the codeword and the tokencode to generate the one-time passcode. In one particular implementation, the combining step comprises an embedding operation that operates over the codeword and the tokencode to generate the one-time passcode. For example, the combining step can comprise a digit-wise addition modulo 10 of the codeword and the tokencode.

The auxiliary information comprises, for example, an indicator of an integrity of the security token, an operational parameter of the security token, and/or randomly evolving key material of the security token.

The authentication and communication techniques of the illustrative embodiments overcome one or more of the problems associated with the conventional techniques described previously, and permit devices to transmit auxiliary information using one-time passcodes. Moreover, no modification of the applications or communication protocols is required. These and other features and advantages of the present invention will become more readily apparent from the accompanying drawings and the following detailed description.

DETAILED DESCRIPTION

The present invention provides techniques for embedding auxiliary information in into a one-time passcode. The auxiliary information can signal, for example, an intrusion after an attacker has compromised a security token, battery-lifetime indicators, or randomly evolving key material. According to one aspect of the invention, the disclosed exemplary techniques provide resistance against the accidental corruption of the auxiliary information m by a typographically incorrect passcode provided by the user. According to another aspect of the invention, the disclosed exemplary techniques permit efficient receiver extraction of the message m that is embedded in a passcode, without a need for brute-force search. Yet another aspect of the invention provides protection of the auxiliary information in against tampering by an adversary: With high probability, an adversary's attempt to swap in auxiliary information m' will result in an invalid, and thus rejected by the receiver, passcode.

In one exemplary embodiment, the auxiliary information is transmitted over a silent alarm channel (SAC) that is implemented over the one-time passcode authentication token. The silent alarm channels can transmit the auxiliary information through the passcodes typed by the user possessing the token.

Figure 1:
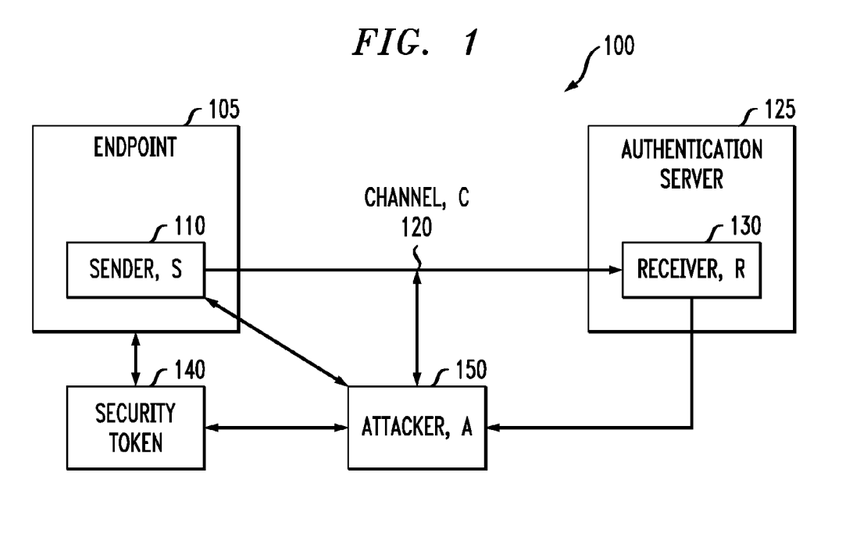
FIG. 1 illustrates a network environment where the present invention can be employed.

FIG. 1 illustrates a network environment where the present invention can be employed. As shown in FIG. 1, a sender S (110) and a receiver R (130) that communicate through a channel 120 that is used to transmit messages from S to R. In the exemplary embodiment, the sender S (110) is part of an endpoint 105 and the receiver R (130) is part of an authentication server 125. The authentication server 125 may be provided, for example, by an authentication authority. Silent alarms correspond to a specific channel 120 that may be compromised by an adversary or attacker A 150 (FIG. 1).

In one embodiment, the endpoint 105 can use a silent alarm channel to convey auxiliary information in the form of status-update reports that alert a trusted receiver 130 to a potential, impending compromise. Even after an adversary A has compromised the device 105, the warning produced by a silent alarm persists in the channel 120. Moreover, the adversary cannot learn or modify the warning, or even detect whether one exists in the channel 120. An adversary A that fully controls the device 105 can at best suppress the channel 120, but at the cost of directly revealing its presence.

U.S. patent application Ser. No. 13/249,957, filed Sep. 30, 2011, entitled "Methods and Apparatus for Secure and Reliable Transmission of Messages Over a Silent Alarm Channel" (now U.S. Pat. No. 8,788,817), incorporated by reference herein, presents silent alarms as a cryptographic primitive that strictly extends the properties of classical secure or forward-secure channels. A general construction is disclosed based on two layers of authenticated encryption over a fixed-size alert-storing buffer, as discussed further below in conjunction with FIG. 2. In particular, this general construction implements a silent alarm scheme, also referred to as a SAC scheme, that comprises a number of components and algorithms run at a sender S and a corresponding receiver R.

As previously indicated, the present invention communicates auxiliary information using one-time passcode authentication tokens (either hardware-based or software-based tokens). In an exemplary implementation, a user of endpoint 105 may authenticate with an authentication server 125 using a one-time passcode generated by a security token generator 140 (hereinafter, referred to as security token) before obtaining access to a protected resource, in a known manner.

The security token 140 can be, for example, separate from and electrically connected to the endpoint 105. The security token 140 may be implemented, for example, using the RSA SecurID® user authentication token commercially available from RSA Security Inc. of Bedford, Mass., U.S.A. The security token 140 may be a server or other type of module that is accessible over a network, or it may be a software component resident on the endpoint device 105. As another alternative, token 140 may be distributed over multiple devices, one of which may be the endpoint device 105. Thus, while the present invention is illustrated herein using a security token 140 electrically connected to the endpoint device 105, such that the endpoint device 105 can read a given token code (or another authentication value) directly from the token 140, other implementations are within the scope of the present invention, as would be apparent to a person of ordinary skill in the art. For example, for other security tokens 140 that are not connectable to a computer or other user device in this manner, the user may manually enter a password or another value displayed by the token 140 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein.

Secret keys evolve in a forward-secure way by making use of a forward-secure pseudorandom number generator (FS-PRNG), where the initial seed is known initially by both the sender S and the receiver R. The FS-PRNG may be implemented, for example, in accordance with the teachings of U.S. patent application Ser. No. 13/334,709, filed Dec. 22, 2011, entitled "Methods and Apparatus for Generating Forward Secure Pseudorandom Numbers;" and/or G. Itkis, "Handbook of Information Security, chapter Forward Security: Adaptive Cryptography—Time Evolution," (2006, John Wiley and Sons), each incorporated by reference herein.

Authentication tokens 140, such as SecurID™, generate one-time passcodes, sequences of (typically eight) decimal digits. A user transcribes a passcode from a token display to another endpoint device 105, e.g., a laptop, to authenticate to a remote service, e.g., a VPN.

Authentication tokens contain secret cryptographic keys for passcode generation. These are symmetric keys shared with a passcode-receiving authentication server. An attacker A that can compromise a user's token 140 and extract its key can clone it, producing a logically indistinguishable duplicate that allows the attacker A to impersonate the user. During a "lunchtime" attack against a hardware token 140, for instance, an adversary A might break open a user's hardware token, extract the key, and then stealthily replace the token 140 to avoid arousing suspicion. Against a software token 140, remote attack is possible via, e.g., key-extracting malware.

Exemplary Construction and Notation

Let t denote a passcode-validity epoch, i.e., an index specifying the exact lifetime period of the $t^{th}$ passcode $r_t$ generated by a token 140. In a time-synchronous SecurID token, for instance, where passcodes are valid for a minute, t is an index for a one-minute window. Let $k_t$ denote a secret key generated by the token at time t and used to derive $r_t$.

An auxiliary channel scheme operates over elements coming from the following sets:

A message space: Let M denote the message space, i.e., $m \in M$ and let l denote the size of M, i.e., $l=|M|$. For instance, m might be a single bit indicating whether or not a hardware-based authentication token has been physically tampered with. In this case $M=\{0,1\}$ and $l=2$.

A passcode space: Let R denote the space of possible passcodes for a token. It is convenient to assume $R=\Sigma^n$ for $\Sigma$ is a set of symbols of size q. For example, in a standard eight-digit SecurID token, $\Sigma$ is the set of decimal digits, i.e., $q=10$, $n=8$, and $R=\{0, 1, \ldots, 9\}^8$.

A key space: Let K denote the space of possible keys for the token, i.e., $k_t \in K$. Let $k=k_0$ denote a "seed" for the token, i.e., an initial key.

The disclosed auxiliary channel scheme encodes messages by means of a codebook C which is randomly selected from a codebook set $\acute{C}$:

Codebooks: A codebook is a set $C \subseteq R$ such that $|C|=|M|=l$; that is, it is a subspace of codewords over R of size that equals the size of the message space M. A message m is encoded as a codeword $c \in C$ that is incorporated, through an embedding function into a passcode for transmission. $C[i]$ denotes the $i^{th}$ word in codebook C, that is, $C=(C[1], C[2], \ldots, C[l])$.

Codebook sets: A codebook set $\acute{C}$ is a collection of codebooks C that may be used in an auxiliary-channel scheme. A codebook C is randomly selected on a unique, per-token or per-transmission basis, as discussed further below in conjunction with FIGS. 8-11.

The disclosed auxiliary channel scheme includes the following functions:

Mapping function: Let $f$ be a bijection $f: M \times K \leftrightarrow Z_l$, i.e., an integer indexing of messages in M, $l=|M|$. This mapping function projects a message m onto a codeword $c \in C$ for transmission. Function $f$ is applied on a per-transmission basis. It may also take as extra input the current key $k_t \in K$, and in this case, if $k_t$ is known, $f$ is reversible through function $f^{-1}(\bullet, k_t)$.

Codebook-selection function: Let g be a codebook-selection function $g: K \to C$. Function g is applied on a per-token or per-transmission basis.

Embedding operator: Let be a pairwise operator over the passcode space, such that $(R,+)$ defines an algebraic group. For convenience, assume that there is an operator $\oplus$ that defines a group over $\Sigma$, and that for $r_a=<a_1 \ldots \|a_n>$ and $r_b=<b_1\| \ldots \|b_n>$, $r_a+r_b=<a_1 \oplus b_1\| \ldots \|a_n \oplus b_n>$. Here, assume that operation is such that for any $r \in R$ there exists a $r' \in R$ so that $r \oplus r'=0$. For instance, + might be digitwise addition (modulo 10). For illustration purposes, this specific instantiation of operation $\oplus$ is used in the examples discussed below. Thus, operations + and − below are well defined on a digitwise fashion.

Thus, an auxiliary channel scheme for message space M on a one-time passcode system defined by pair (K,R) of spaces consists of the tuple $\acute{C}; (\oplus, f, g)$.

A passcode r is referred to as raw, or a tokencode or protocode, into which no auxiliary data has been embedded. An enhanced passcode r' is one that contains auxiliary data. Briefly, an enhanced passcode is computed as $$r'=r \oplus c,$$

where r is the current protocode and c is a codeword representing an auxiliary-data message in.

Figure 2A:
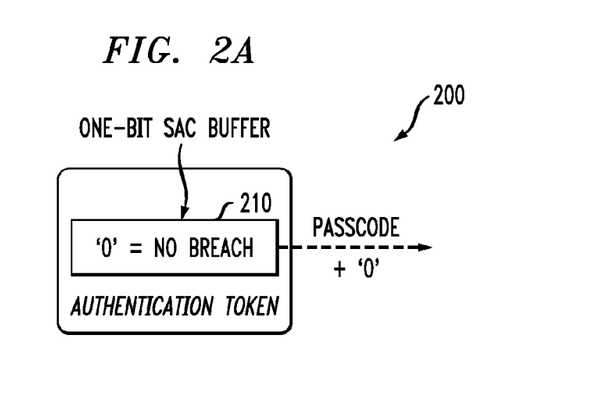
FIGS. 2A and 2B illustrate exemplary auxiliary information that may be embedded in a one-time passcode in accordance with an aspect of the present invention.
Figure 2B:
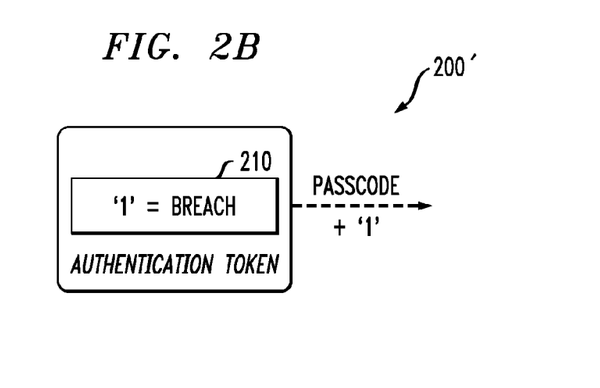

FIGS. 2A and 2B illustrate exemplar auxiliary information that may be embedded in a one-time passcode in accordance with an aspect of the present invention. An exemplary silent alarm channel 200 buffers a single, one-bit message, referred to as a "breach attempt" flag 210. As shown in FIG. 2A, prior to a compromise by an attacker, the exemplary one-bit breach attempt flag 210 is set to a binary value of zero (0) to indicate that a breach has not occurred. After a breach, the exemplary one-bit breach attempt flag 210 is set to a binary value of one (1) to indicate that a breach has occurred, as shown in FIG. 2B. As shown in FIGS. 2A and 2B, the exemplary one-bit breach attempt flag 210 is transmitted by the token 140 together with the passcode, as discussed further below.

In a hardware token 140, a flag might be raised, for example, in response to a physical attempt at tampering (e.g., a broken electrical contact). In a software token 140, there are a wide range of possible triggers, e.g., Tripwire-style detection of token code modification.

Figure 3:
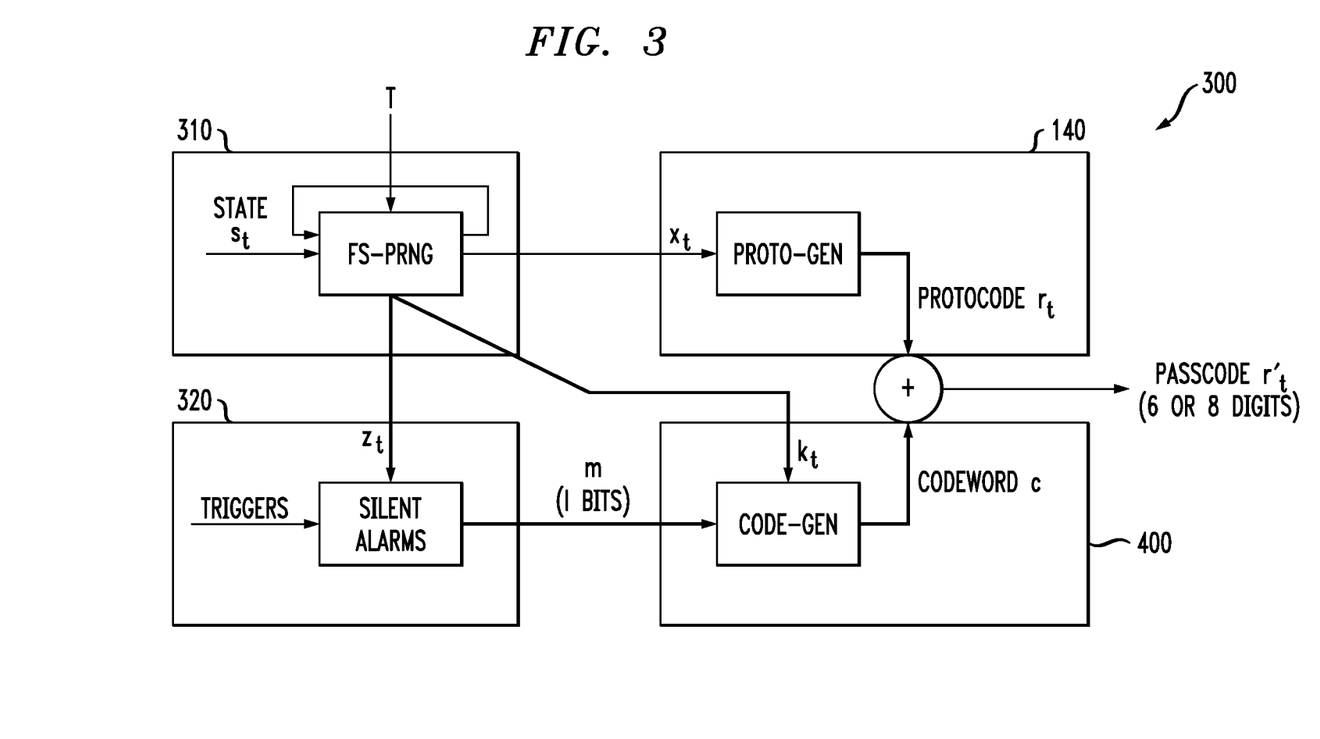
FIG. 3 is a block diagram of an exemplary authentication system in accordance with aspects of the present invention.

FIG. 3 is a block diagram of an exemplary authentication system 300 in accordance with aspects of the present invention. As shown in FIG. 3, the exemplary authentication system 300 comprises a forward security module 310, a protocode generation module 140 (also referred to as a security token generator 140), a silent alarm module 320, and an auxiliary channel 400, as discussed further below in conjunction with FIG. 4.

The silent alarm module 320 can be implemented for example, in accordance with the teachings of U.S. patent application Ser. No. 13/404,788, filed contemporaneously herewith and entitled "Methods and Apparatus for Silent Alarm Channels Using One-Time Passcode Authentication Tokens," incorporated by reference herein.

Generally, given an initial state, $s_t$, the forward security module 310 generates pseudo-random numbers $k_t$, $x_t$ and $z_t$, used by the auxiliary channel 400, protocode generation module 140 and silent alarm module 400, respectively. The forward security module 310 may be implemented, for example, in accordance with the teachings of U.S. patent application Ser. No. 13/334,709, filed Dec. 22, 2011, entitled "Methods and Apparatus for Generating Forward Secure Pseudorandom Numbers;" and/or G. Itkis, "Handbook of Information Security, chapter Forward Security: Adaptive Cryptography—Time Evolution," (2006, John Wiley and Sons), each incorporated by reference herein.

Encoding and Decoding Via the Auxiliary Channel 400

Figure 4:
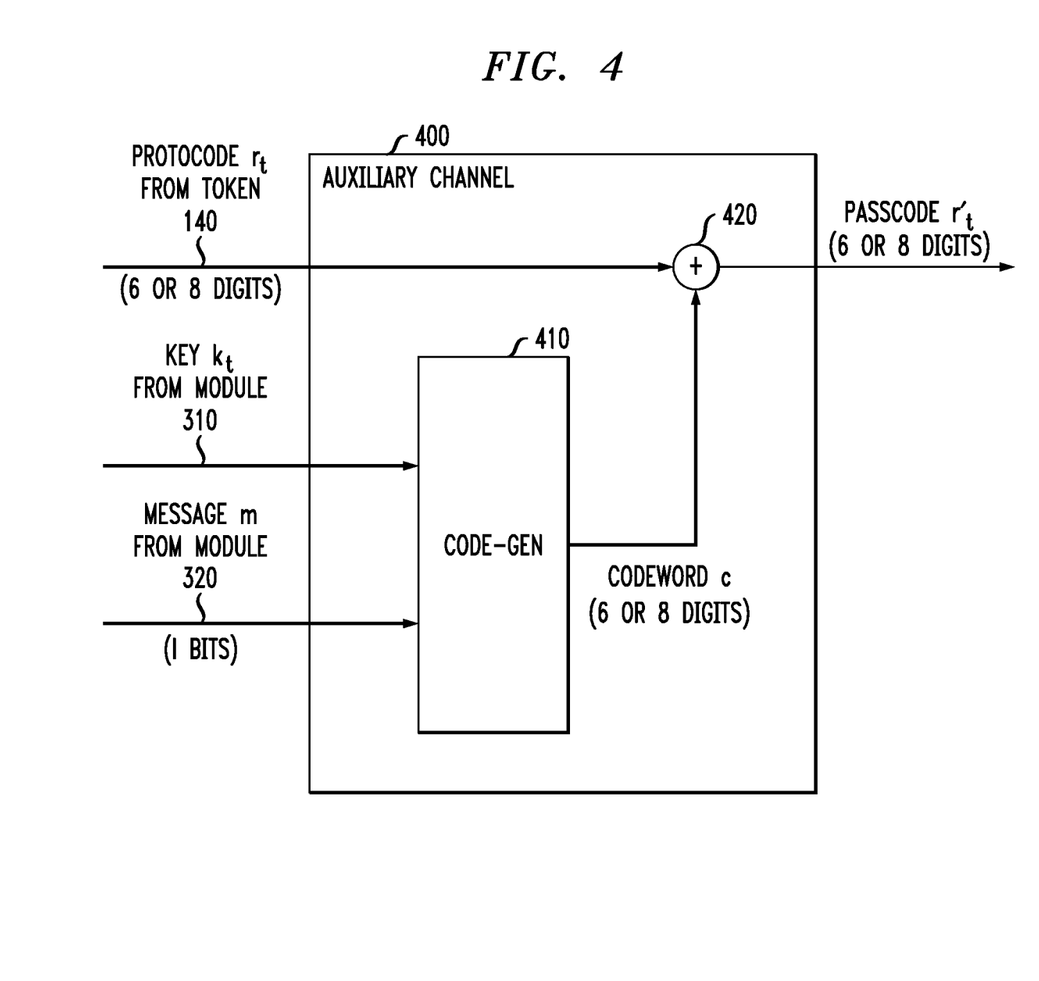
FIG. 4 is a block diagram of an exemplary auxiliary channel of FIG. 3.

FIG. 4 is a block diagram of an exemplary auxiliary channel 400 of FIG. 3. As shown in FIG. 4, the auxiliary channel 400 comprises a code generator 410 that employs a codebook C to process the l-bit message m generated by the silent alarm module 320 of FIG. 3 and generates the codeword c. An exemplary mapping of message in to a codeword c in the codebook C using the key k, is discussed further below in conjunction with FIG. 5. For example, each message m can be mapped to a codeword c in the codebook C. This codeword c is combined by an adder 420 with $r_t$ to produce an enhanced, displayed passcode $r'_t$. As discussed further below in conjunction with FIG. 7, the passcode $r_t$ and codeword c are combined in an exemplary embodiment by an adder 420 via a symbol-wise group operation $\oplus$, e.g., digitwise addition mod 10.

In the exemplary embodiment shown in FIG. 4, the message m is l bits and the codeword c, protocode $r_t$ and passcode $r'_t$ are each 6 or 8 bits.

Figure 5:
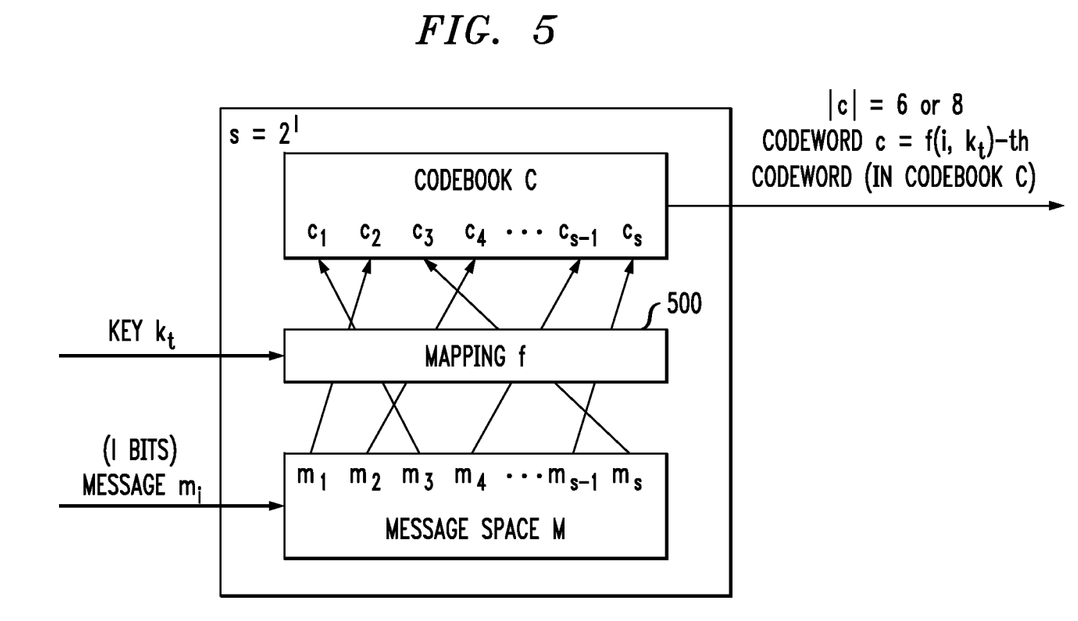
FIG. 5 illustrates an exemplary mapping of message m to a codeword c in the codebook C using the key $k_t$.

FIG. 5 illustrates an exemplary mapping 500 of message m to a codeword c in the codebook C using the key $k_t$. It is noted that message $m_i$ is the i-th message in message space M, and there are $2^l$ possible messages.

Figure 6:
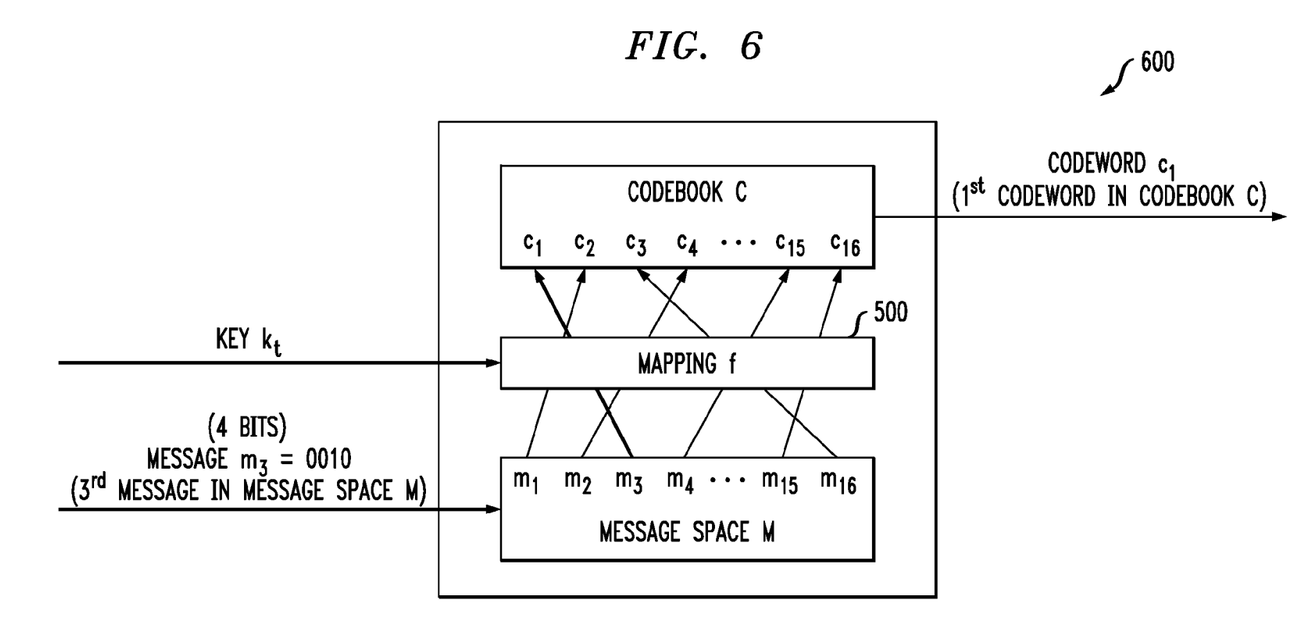
FIG. 6 illustrates a particular mapping for a given exemplary message $m_3$ to a codeword $c_1$ in the codebook C using the key $k_t$.

FIG. 6 illustrates a particular mapping 500 for a given exemplary message $m_3$ to a codeword $c_1$ in the codebook C using the key $k_t$. It is noted that message $m_3$ is the third message in message space M and codeword $c_1$ is the first codeword in codebook C.

Figure 7:
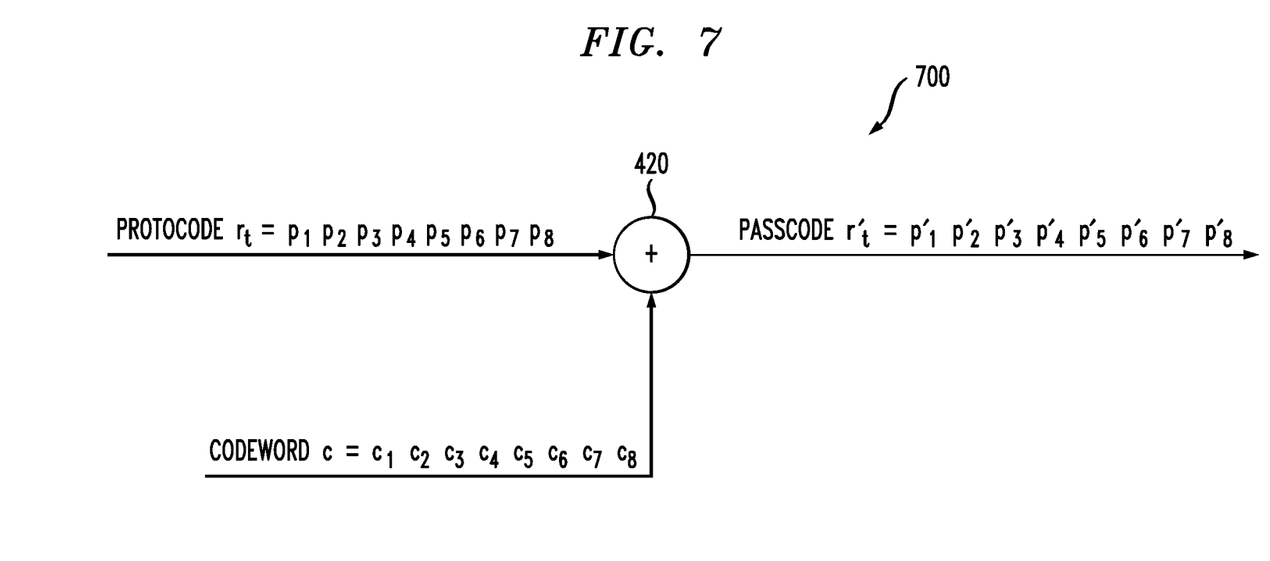
FIG. 7 illustrates an exemplary implementation of the adder of FIG. 4.

As discussed above in conjunction with FIG. 4, the codeword c is combined by an adder 420 with $r_t$ to produce an enhanced passcode $r'_t$. FIG. 7 illustrates an exemplary implementation of the adder 420 of FIG. 4. As shown in FIG. 7, the exemplary 8-digit passcode $r_t$ and exemplary 8-digit codeword c are combined by the adder 420 via a symbolwise group operation ⊕, e.g., digitwise addition mod 10, to produce the exemplary 8-digit enhanced passcode $r'_t$. The exemplary digitwise addition mod 10 comprises the following operation for each digit:

$$p'_i = p_i + c_i \bmod 10$$

Thus, for an exemplary 8-digit passcode $r_t$ equal to 9 0 0 2 4 6 7 8, and an exemplary 8-digit codeword c equal to 5 6 9 0 2 4 7 7, the output of the adder 420 will be the following exemplary 8-digit enhanced passcode $r'_t$ 4 6 9 2 6 0 4 5.

Auxiliary Channel Algorithms

An exemplary initialize algorithm is used to set up the system. An exemplary encode algorithm is used to embed a message m in a raw passcode. An exemplary decode algorithm is used to later extract the same message from the corresponding enhanced passcode.

In one embodiment, the codebook C is generated only once, i.e., on a per-token basis, through the initialize algorithm that runs once at the token and at the receiver.

The auxiliary channel is set up using the exemplary initialize algorithm as follows:
initialize $(k_0) \rightarrow C$,
where $C \leftarrow g(k_0)$ and then output C.

A message m is embedded in a raw passcode using the exemplary encode algorithm as follows:
encode $(C, k_t, r_t, m) \rightarrow r'_t$, where
$c \leftarrow C[f(m, k_t)]$;
$r'_t \leftarrow r_t + c$;
output $r'_t$ The same message is later extracted from the corresponding enhanced passcode using the exemplary decode algorithm as follows:
decode $(C, k_t, r_t, r^*_t) \rightarrow \{m \cup \bot\}$, where
$c^* \leftarrow r^*_t - r_t$;
$i^* \leftarrow \text{Look\_Up}(C, c^*)$
If $i^* \neq \bot$ then OUTPUT $m = f^{-1}(i^*, k_t)$ (i.e., $c^* \in C$ and $c^*[i^*]$)
else
OUTPUT ⊥
End if.

Operation Look_Up(C,c*) denotes the execution of an exemplary algorithm that searches in codebook C to locate codeword c*: If the search is successful the algorithm returns the index of the codeword c*; or otherwise the failure sign ⊥ (here, the symbol ⊥ signifies a decoding error). In practice, consider C to be organized as an efficient dictionary data structure (e.g., hash table or search tree), where key-value pairs are stored, keys being the passcode indices and values being the codewords, and then Look_Up(C,c*) implements any efficient search algorithm for this dictionary. Thus, the search can be performed in O(log l) time if a search tree is used or even in amortized O(1) time if a hash table is used. This use of an efficient dictionary for finding the exact codewords provides efficiency for message recovery, i.e., embedded messages are recoverable through selective, and not brute force, search over the message space.

Codebook Construction

A message m is translated into a codeword c∈C prior to its embedding in a raw passcode, as specified above. The specifics related to the codebook construction provide two resilience properties.

First, the mapping of messages from M into a codebook C provides resilience to erroneous typing, i.e., tolerance of human typographical errors: This is done by constructing C as an error-detection code. See, e.g., S. Lin and D. J. Costello, Jr., *Error Control Coding: Fundamentals and Applications.* (1983, Prentice Hall), incorporated by reference herein. The degree of provided error-detection is a function of its minimum distance, that is, the smallest number of differing digits over all pairs of codewords. In particular, let $\delta(c_0, c_1)$ denote the number of differing symbols between codewords $c_0$ and $c_1$. Then the minimum distance of a codebook C is defined as $$d = \min_{c_0, c_1 \in C} \delta(c_0, c_1),$$

and thus up to d−1 typographical errors in the typed passcode can be tolerated, as the server will simply reject the mistyped passcode, since the corresponding codeword will not match any valid codeword in C. For instance, over eight-digit passcodes, a three-element codebook with minimum distance 3, and thus capable of detecting up to 2 typographical errors, is
C={00000000,01040009,02020002}.

Second, random diversification (and thus not knowledge by an attacker) of the codebook set C (for example, on a per-tokenbasis) provides resilience to message tampering, i.e., tolerance of adversarial modification of an encoded message m. The choice of codebook C acts as a message authentication code on the basis that the attacker does not know the (per-token or per-transmission) randomly generated valid codewords of the codebook C that is in use.

To see why codebook C must be protected, consider an adversary that knows the codebook C in use in a token, and can guess the current codeword c∈C used to transmit a message m in raw passcode r. Then, the adversary can select a second message m*, with corresponding codeword c*∈C, to swap in for m. In particular, it can compute the enhanced passcode r*=r'−c+c*=(r+c)−c+c*=r+c*, and swap it in for the original enhanced passcode r'=r+c. Selection of a random codebook C helps prevent this attack.

The properties of resilience to erroneous typing and of resilience to message tampering are functionally similar, as they both ensure that the receiver rejects passcodes that are erroneously or adversarially altered, but they are qualitatively and quantitatively distinct, as they are achieved by different mechanisms and they achieve different degrees of security. Namely, the resilience to erroneous typing is based on the use of an error-detecting codebook C, whereas the resilience to message tampering is based on the use of a random codebook C. Generally, one property does not imply the other.

The disclosed auxiliary channel scheme increases the space of valid passcodes (i.e., the passcodes in R that can be generated as valid passcodes by the token so that they are accepted by the receiver) by a factor of l, because any one valid protocode can be combined with l possible codewords to give a valid enhanced (transmitted) passcode. This also means that an attacker's search space for guessing a valid transmitted passcode is decreased by a factor of l. In an information theoretic sense, this is expected to be the case, because the auxiliary channel of message space l=|M| uses the main communication channel to transmit log l bits of information, so the main communication channel now carries exactly log l less bits of information.

Per-Token Codebook Selection Procedure

Figure 8:
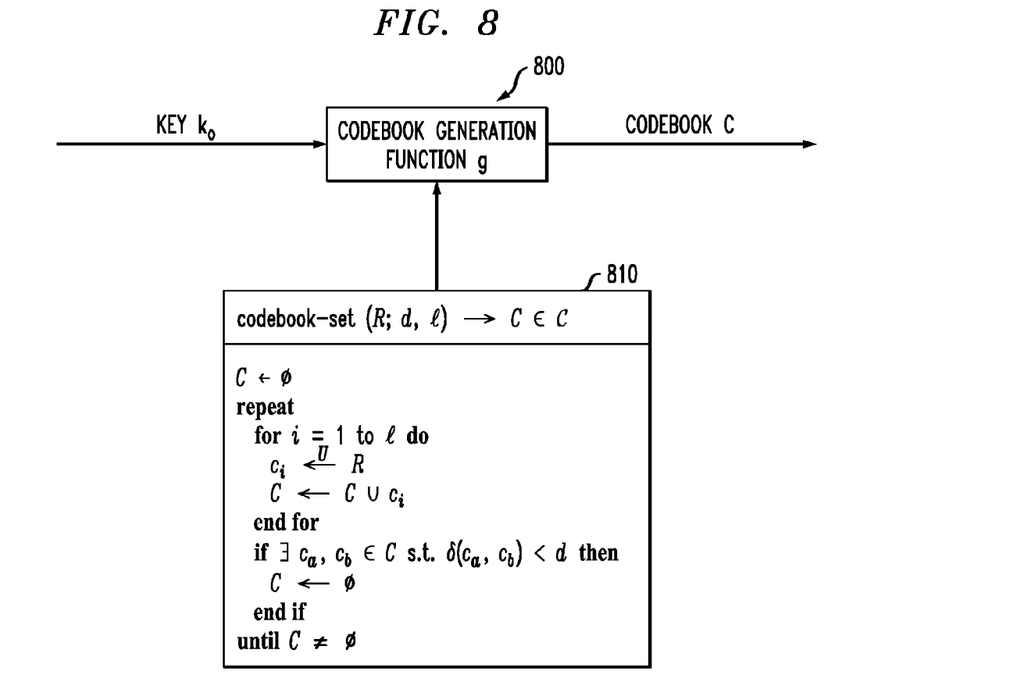
FIG. 8 illustrates a codebook generation function g that generates a codebook C.

FIG. 8 illustrates a codebook generation function g 800 that generates a codebook C. A codebook set Ć is the set of all codebooks C with minimum distance d. As discussed hereinafter, the codebook generation function g 800 is run once at set-up at the token 140 and the authentication server 125. The codebook generation function g 800 generates the entire codebook C, which is stored. The codebook C is: (1) secret and (2) of an error-correction code of distance d.

As shown in FIG. 8, the codebook generation function g 800 is started with an initial seed, key $k_0$. The codebook generation function g 800 employs an algorithm 810, shown in FIG. 8, that implements the codebook selection function g by randomly sampling codebooks C∈Ć with the appropriate minimum distance d. Intuitively, the algorithm 810 selects a set of random elements of R as a codebook C. If there is a pair of d-close passcodes in C, i.e., with distance between them less than d, then the codebook is discarded, and a new one generated. Here, l denotes the size of the produced codebook C, l=|C|, and d denotes the target minimum distance.

Efficiency and Codebook Existence

The probability that a codebook C generated by Algorithm 810 has d-close codewords (and is therefore invalid) may be computed as follows. The fraction of codewords in R that are d-close to a given codeword c is $$\left( \sum_{i=0}^{d} n(q-1)^i \right) / q^n.$$

Thus, given a set of ≤u codewords, the probability that a randomly selected codeword is d-close to any codeword in the set is at most $$u \times \left( \sum_{i=0}^{d} n(q-1)^i \right) / q^n.$$

Consequently, the probability $p_{R;d,l}$ that any two codewords in a randomly generated codebook C of size l are d-close may be bounded above by:

$$p_{R;d,l} \leq \sum_{j=1}^{l-1} j \times \left( \sum_{i=0}^{d} n(q-1)^i \right) / q^n \leq \qquad (1)$$

$$(l-1)^2 \times \left( \sum_{i=0}^{d} n(q-1)^i \right) / q^n.$$

The value $1/(1-p_{R;d,l})$ is an upper bound on the expected number of codebooks generated by Algorithm 810, i.e., its running time.

Note that if $p_{R;d,l} < 1$, there must exist at least one valid codebook.

Security Analysis

For a given message m with corresponding codeword c, and given r'=r+c, what is the probability that an adversary can compute a valid passcode r* with corresponding message m*≠m? In order to do so, the adversary must find some z s.t. c+z=c' for some c'∈C.

Consider the set of all possible codewords c' at distance ≥d from c. By symmetry, the event c'∈C is equiprobable over all such c'. Thus, the adversary's best guess for z is simply a uniform one over the set $Z_d$ of all passcodes z such that $\delta(\vec{0}, z) \geq d$. As there are l−1 valid codewords guessable by the adversary, it is straightforward to show that the adversary's success probability is:

$$(l-1)/|Z_d| = (l-1) / \left( \sum_{i=d}^{n} n(q-1)^i \right). \qquad (2)$$

This probability is referred to as the message-swapping probability of an auxiliary-channel scheme.

The output of Algorithm 810 may be stored and recomputed efficiently as follows. Use h(k, j) as a pseudorandom seed for the generation of the $j^{th}$ candidate codebook, i.e., after discarding j−1 codebooks with d-close codewords, make use of h(k, j) to generate the next one. The final value of j may be used to regenerate the final output of the algorithm.

A codebook C may be viewed as an error-detecting code. The function g, which selects a codebook pseudorandomly, plays the role of a message-authentication code (MAC) under key $k_0$ (or $k_t$ in general), thus enforcing the property of message-integrity protection. This view of g is made clearer by commuting the two functions. If f encodes a message in as an index i, then $g(k_t,i)$ may be viewed as a MAC on message i.

Example

Application to SecurID

Consider the embedding of a four-bit message in an eight-digit passcode token such as SecurID. Thus M={0,1}$^4$, while R={0, 1, . . . , 9}$^8$.

As l=|M|=2$^4$=16, then l=16, i.e., codebooks C of cardinality 16 must be worked over. Suppose that it is desired to construct codebooks that are resilient to at least two typographic errors, i.e., with d=3.

By Eqn. 1, $p_{R;3,16} \leq 15^2 \times 43,165/10^8 \approx 0.1$. That is, over 90% of randomly generated codebooks will be valid in the sense of having distance d between all codeword pairs. So the codebook-computation algorithm 810 will, a large majority of the time, generate only one codebook, i.e., terminate after a single round.

Alternative Constructions Over Basic Scheme

Alternative Codebook-Construction Algorithm

Alternatively, Algorithm 810 can be modified to a more efficient construction algorithm where the codebook is constructed randomly but in an incremental fashion: starting from an empty codebook a random new codeword is added in the codebook as long as it does not violate the d-closeness requirement (i.e., as long as the new codeword is at least d symbols apart from any other codeword currently in the codebook). This improves performance, especially in the per-transmission codebook-construction setting.

Alternative Decoding Algorithm

Alternatively, the decode algorithm may try to correct a small number of human-introduced errors caused by mistyping (and not only detect any such number of errors). In particular, if the codebook C has large enough minimum distance d, then under the assumption that most human-introduced mistyped characters are less than d/2, the receiver can correct these errors by trying to output an embedded message that corresponds to the codeword in C that is the closest to the codeword $c^* = r^*_t - r_t$, where $r^*_t$ is the received enhanced (and possibly mistyped) codeword and $r_t$ is the corresponding protocode. This corresponds to use of C as an error-correcting code.

In detail, the decoder operations are as follows. If $\perp = i^* \leftarrow \text{Look\_Up}(C, c^*)$, then instead of outputting $\perp$, the decoder computes, if it exists, the codeword $c' \in C$ that is closest to $c^*$ within half the distance d of the codebook C. That is, it computes c' such that $c' \in C$, $d(c', c^*) < d/2$ and there is no $c'' \in C$ with $c'' \neq c'$ such that $d(c'', c^*) < d(c', c^*)$. Note that if such c' exists, then this is unique: only one codeword in C can be within d/2 distance from c', or otherwise C is not of minimum distance d. If c' exists, then let $c' = C[i^{}]$, and the decoder outputs $m = f^{-1}(i^{}, k_t)$ (i.e., the decoder is able to correct a less-than-half-the-distance number of errors). If c' does not exist, then the decoder outputs $\perp$ (i.e., the decoder is able to detect an at-least-half-the-distance non-correctable number of errors).

This alternative scheme offers a better tolerance of human mistyped passcodes. It is noted, however, that in this case the guessing probability of a valid, i.e., acceptable by the receiver, passcode in C by an adversary is higher, as more than $l = |M| = |C|$ passcodes are accepted by the receiver.

Alternative Mapping Function

As previously indicated, alternatively, the mapping function $f$ may depend on the secret key value $lk_t$, i.e., $f: M \times K \leftrightarrow Z_l$. In this case, the mapping function is used to project a message m onto a codeword $c \in C$ for transmission in a way that depends on the current secret key $k_t$. This way, an attacker has a harder task in guessing the codeword $c \in C$ that a message m corresponds to.

Alternative Codebook-Refreshing Policy

Alternatively, codebooks may be constructed on a per transmission basis. In this configuration, initialize $(k_0) \rightarrow C$ is not run at the token and the receiver once at the beginning, but instead initialize $(k_t) \rightarrow C_t$ is run at the beginning of algorithms encode and decode. That is, codebook $C_t$ is now updated on a per-transmission basis. (Note that keys $k_t$ are used by algorithms encode and decode only in this configuration.) We describe such a per-transmission codebook C in the next Section.

Alternative Per-Transmission Codebook Selection Procedure

According to another aspect of the invention, an alternative codebook construction is provided that is more appropriate when the codebook is constructed on a per-transmission basis, that is, when the passcode selection function g: $K \rightarrow C$ is called on demand, for the passcode generation at time t, to generate codebook $C_t$ as $C_t = g(k_t)$.

Figure 9:
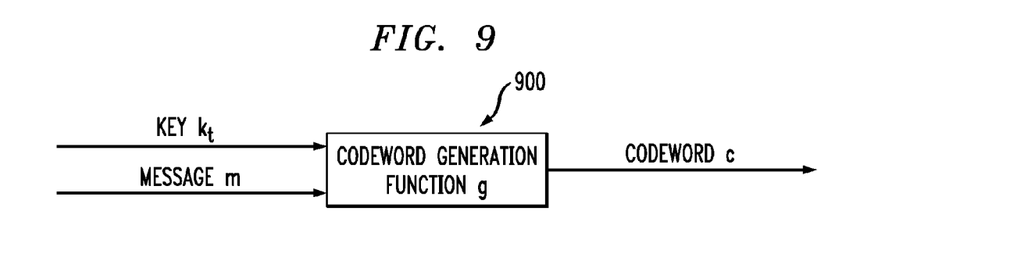
FIG. 9 illustrates a codeword generation function g that generates a codeword c for each transmission.

FIG. 9 illustrates a codeword generation function g 900 that generates a codeword c for each transmission. As discussed hereinafter, the codeword generation function g 900 is run at the token 140 and/or server 125 on any passcode transmission. The codeword generation function g 900 generates only a codeword c (codebook $C_t$ is not explicitly generated). As with the codebook generation function g 800 of FIG. 8, the codeword generation function g 900 is: (1) secret and (2) of an error-correction code of distance d. As shown in FIG. 9, the codeword generation function g 900 processes the message m using a key $k_t$.

It is noted that a per-transmission codebook-generation procedure adds two extra characteristics:
Better resiliency against leakage of the codebook C: If only one codebook C is used and it is leaked then the security of the auxiliary channel scheme is drastically affected. Instead, if the codebook $C_t$ evolves over time (perhaps in a forward-secure way), then leakage of a particular codebook C, has limited consequences in terms of security: Indeed, the new codebook $C_{t+1}$ will be secret and thus unknown to the attacker, so the new auxiliary message $m_t$ will be protected independently of whether $C_t$ has been leaked.
A time-evolving codebook $C_t$ essentially incorporates a time-evolving mapping function $f: M \times K \leftrightarrow Z_l$, exactly because the codewords that comprise the codebook evolve over time themselves.

As previously indicated, to provide the disclosed auxiliary channel scheme with resilience against erroneous typing and resilience against message tampering, the underlying codebook $C_t$ should respectively satisfy the following two properties:

1. $C_t$ must be an error-detection code with minimum distance d; and

2. $C_t$ must be a (pseudo)random codebook, known only to the token and the authentication server.

The per-transmission codebook generation procedure employed in FIG. 9 satisfies the above properties as follows:

1. $C_t$ is derived implicitly and pseudorandomly by an underlying fixed and not necessarily secret binary error-correcting code B of size $|B| = l = |M| = |C_t|$, $t > 0$, where B is of distance d. For instance, if $l = 16$ and passcodes consist of 8 digits, the extended Hamming distance code [7,4,3] can be used which gives an [8,4,4] code that can tolerate up to 3 mistyped digits in a passcode.

2. Instead of explicitly generating the codebook $C_t$, if $m \in M$ is the auxiliary message, the corresponding codeword $c = C_t[f(m, k_t)]$ is generated as follows. Key $k_t$ is used to create a set of pseudorandom bits of appropriate length, and then each bit $b_i$ of the $f(m, k_t)$-th binary codeword $b \in B$ is distorted/mapped to digit $c_i = b_i \cdot d_i$, where $d_i$ is a non-zero pseudorandom digit generated by the pseudorandom bits generated by $k_t$).

The Hamming distance code [8,4,4] mentioned above code is:

00000000,11100001,10011001,01111000,01010101,
10110100,11001100,00101101,
11010010,00110011,01001011,10101010,10000111,
01100110,00011110,11111111.

Figure 10:
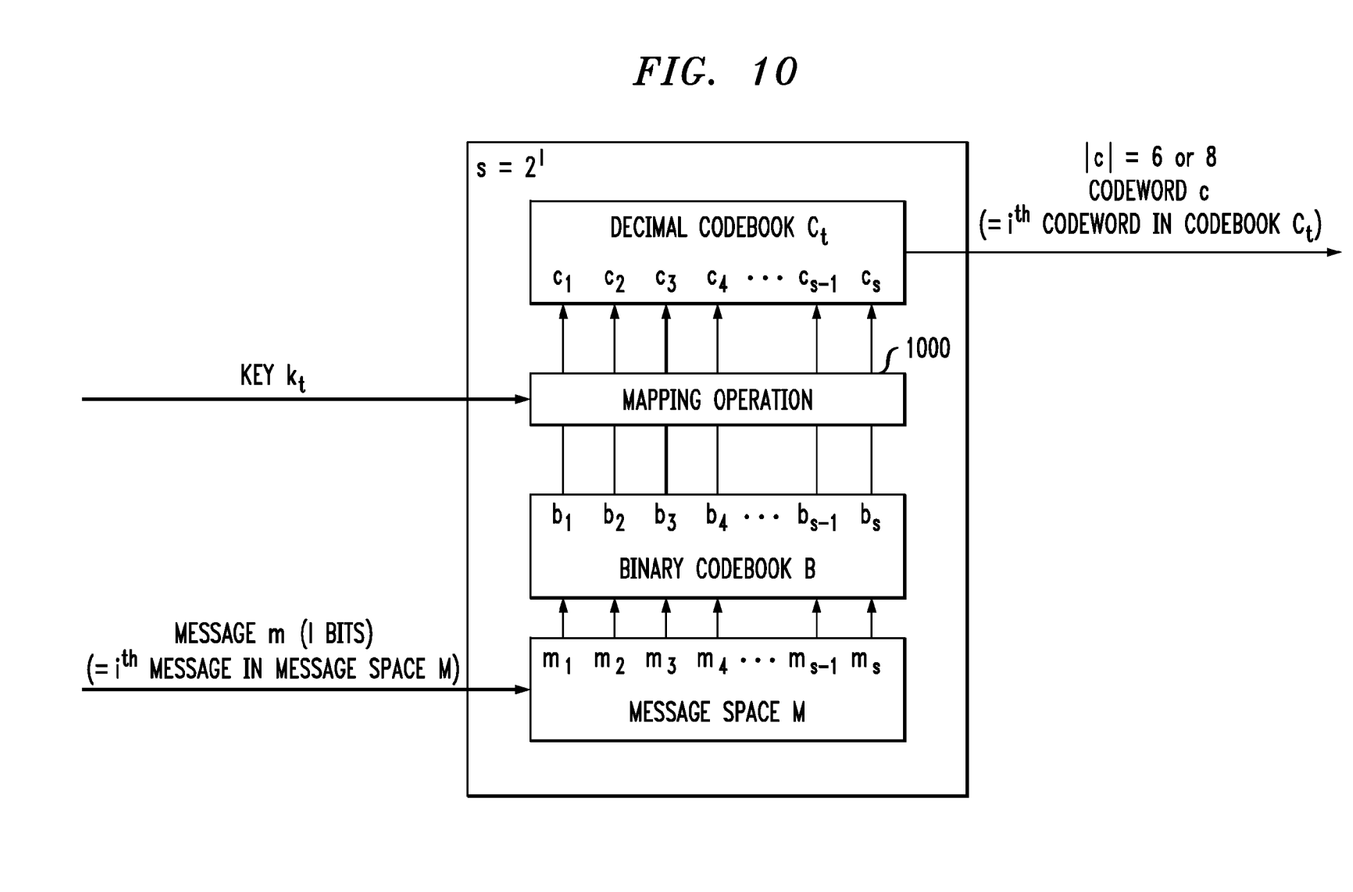
FIG. 10 illustrates an exemplary mapping of message m to a codeword c generated for a current transmission using the key $k_t$.

FIG. 10 illustrates an exemplary mapping 1000 of message m to a codeword c generated for this transmission using the key $k_t$. It is noted that message m is the i-th message in message space M, and there are $2^l$ possible messages. The j-th bit of i-th codeword is:

$$c_i^j = b_i^j \cdot d^j$$

where $d^j$ is randomly selected by key $k_t$ from $\{1, 2, 3, 4, 5, 6, 7, 8, 9\}$.

The binary codebook B is explicitly stored but the message space M and codebook $C_t$ need not be explicitly stored.

Figure 11:
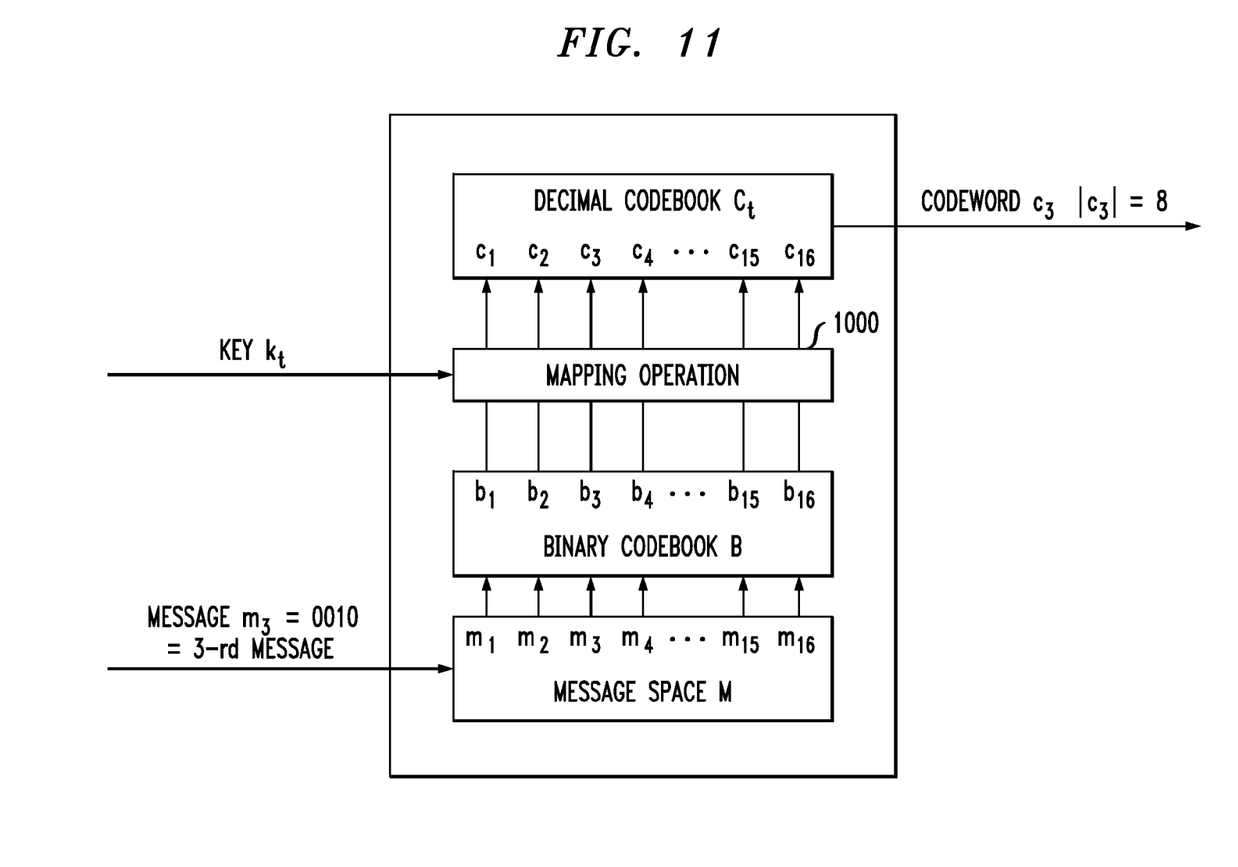
FIG. 11 illustrates a particular mapping for a given exemplary message $m_3$ to a codeword $c_3$ using the key $k_t$.

FIG. 11 illustrates a particular mapping 1000 for a given exemplary message $m_3$ (e.g., equal to 0011) to a codeword $c_3$ using the key $k_t$. It is noted that message $m_3$ is the third message in message space M and codeword $c_3$ is the third codeword in the decimal codebook $C_t$. $b_3$ in the binary codebook B is equal to 1 0 0 1 1 0 0 1; d a function of the key $k_t$, is equal to 9 5 7 3 2 2 8 8; and generated codeword $c_3$ is qual to 9 0 0 3 2 0 0 8.

The proposed per-transmission code book selection procedure based on (1) a fixed binary code B of distance d and (2) a per-transmission ($k_t$-dependent) mapping $w_t \in \{1, \ldots, n\} \to \Sigma \backslash \{0\}$ from positions to non-zero symbols generates codebooks $$C_t = \{(b_1 w_t(1), b_2 w_t(2), \ldots, b_n w_t(n)) \in \Sigma^n : (b_1, b_2, \ldots, b_n) \in B\}.$$

Since $w_t$ outputs non-zero symbols, $C_t$ has minimum distance d and has therefore the same error detecting capabilities as the underlying binary code B. This means that its resilience to erroneous typing is completely determined by the underlying code B.

The resilience to message tampering is computed as follows. An adversary, who wants to modify an embedded codeword c into a different one c', needs to add the difference c'−c to the enhanced passcode. If B is a linear binary code (e.g., the extended Hamming code), then taking any codeword $(b_1, \ldots, b_d)$ of minimal weight (i.e., it has exactly d non-zero entries) can be used to guess a difference c'−c that will change the embedded codeword into a different one: For each of the d non-zero positions, the adversary guesses the correct value outputted by $w_t$ together with whether it needs to be added or subtracted in order to compute c'−c. For example, suppose that $b_i=1$. If c' is based on a codeword b' in B with $b'_i=1$, then the i-th entry in c'−c has value $v=-w_t(i)$. If c' is based on a codeword b' in B with $b'_i=0$, then the i-th entry in c'−c has value $v=w_t(i)$. Since v is non-zero and $\Sigma$ has cardinality q, v can be guessed correctly with probability at least $1/(q-1)$. Since the adversary needs to guess d values v (corresponding to the non-zero codeword symbols $b_i$), the adversary successfully tampers with the embedded message with probability at least $(q-1)^{-d}$.

The lower bound is met if the mapping $w_t$ produces non-zero symbols equally likely. In general this is not the case. The reason is that q−1 may not be a power of two, hence, since $w_t$ uses a bit string derived from $k_t$ to compute non-zero symbols, some non-zero symbols occur more often than others. As an example, let $\Sigma \backslash \{0\}$ represent the non-zero digits $\{1, \ldots, 9\}$ (q−1=9). Let $w_t$ be a mapping that uses $k_t$ to produce n bit strings of length 3 which are mapped into n integers in $\{1, \ldots, 8\}$. For this mapping the adversary may guess v=2 which is correct with probability 1/8. This leads to success probability $1/8^d$, slightly higher than the lower bound $1/9^d$.

A general procedure for transforming u bits to a non-zero symbol in $\Sigma \backslash \{0\} = \{1, \ldots, q-1\}$, is to interpret the u bits as an integer x in $\{0, 1, \ldots, 2^u-1\}$ and compute 1+(x mod(q−1)). If we use this transformation in $w_t$, then the probability p of a successful tampering attack can be computed as follows. Let $2^u=(q-1)a+e$ with $0 \le e < q-1$. Then there are e non-zero symbols that each occur with probability $(a+1)/2^u$ and q−1−e non-zero symbols that occur with probability $a/2^u$. If $e \ne 0$, then $p=[(a+1)/2^u]^d$ and if e=0, then $p=[a/2^u]^d$. In both cases $$p = \lceil \lceil 2^u/(q-1) \rceil / 2^u \rceil^d$$

which approximates the lower bound $1/(q-1)^d$ for large u.

The security analysis is different for non-linear binary codes B. For example, let $\Delta > d$ and, for $d \le j < \Delta$, let set $S_j = \{\{b', b\} : b', b \in B$ and $\delta(b', b) = j\}$ have cardinality $z_j \ge (q-1)^{\Delta-j}$. Suppose that set $\{b'-b : b', b \in B$ and $\delta(b', b) = j\}$ also has cardinality $z_j$ for $d \le j < \Delta$. Due to the non-linearity of B it may be possible that this condition is satisfied. In this case, the adversary needs to guess the correct difference b'−b (where b corresponds to c and b' corresponds to c') together with guessing the non-zero values of rv, corresponding to the non-zero positions in b'−b. Hence, the condition implies that the probability of a successful tampering attack is $\approx (q-1)^{-\Delta}$.

Any binary code of length 8 with 16 codewords and minimum distance 4 is equivalent to the extended Hamming code. For this reason, the probability of successful tampering cannot be reduced by considering a non-linear binary code instead of the extended Hamming code.

If the enhanced passcode based on the extended Hamming code is truncated to 6 symbols, then this is equivalent to first truncating the raw passcode and adding a codeword in the truncated code $C_t$. If the extended Hamming code is truncated to 6 bits, then a linear binary code of length 6, dimension 4 and distance 2 is obtained. There does not exist another linear code with the same length and dimension but with a higher distance.

CONCLUSION

As previously indicated, the above-described embodiments of the invention are presented by way of illustrative example only. Numerous variations and other alternative embodiments may be used, as noted above. For example, FIGS. 9-11 provide a number of extensions of the embodiment described above in conjunction with FIGS. 3-8.

The present invention provides methods and apparatus for embedding auxiliary information m into a one-time passcode. The auxiliary information can signal, for example, the physical integrity of the security token, battery-lifetime indicators, or randomly evolving key material.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide techniques for embedding auxiliary information m into a one-time passcode. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for embedding auxiliary information in authentication information transmitted to a receiver, comprising:
   obtaining said auxiliary information;
   mapping said auxiliary information to a codeword using a secret key, wherein said secret key is shared between a security token and an authentication authority, wherein said codeword comprises an error detection codeword defined by a codebook, wherein said error detection codeword has a minimum number of differing digits, d, with other error detection codewords defined by said codebook; and combining said codeword with a tokencode generated by said security token to generate a one-time passcode, wherein up to d−1 digit errors can be detected in said one-time passcode, wherein at least one of said mapping and combining steps are performed by one at least one hardware device.

2. The method of claim 1, further comprising the step of transmitting said one-time passcode to said receiver.

3. The method of claim 1, wherein said tokencode is based on a forward secure pseudo random number.

4. The method of claim 1, wherein said mapping step employs a mapping function that maps a given message in a message space to a given codeword in said codebook.

5. The method of claim 4, wherein said codebook comprises an error-correction codeword having said minimum number of differing digits, d, with other error-correction codewords defined by said codebook.

6. The method of claim 4, wherein said codebook is generated once for said security token using said secret key.

7. The method of claim 4, wherein said codeword is generated for a given transmission using said secret key.

8. The method of claim 7, wherein said secret key provides forward security.

9. The method of claim 7, wherein said given message in a message space is mapped to a binary codeword in said codebook and said binary codeword is mapped to a decimal codeword in a decimal codebook using said shared secret key, wherein said decimal codebook comprises error-correction codewords of a same minimum number of differing digits, d, with other decimal codewords defined by said decimal codebook.

10. The method of claim 1, wherein said combining step comprises an addition of said codeword and said tokencode to generate said one-time passcode.

11. The method of claim 1, wherein said combining step comprises an embedding operation that operates over said codeword and said tokencode to generate said one-time passcode.

12. The method of claim 1, wherein said combining step comprises a digitwise addition modulo 10 of said codeword and said tokencode.

13. The method of claim 1, wherein said receiver comprises an authentication server.

14. The method of claim 1, wherein said auxiliary information comprises a one-bit message indicating whether said security token has been attacked.

15. The method of claim 1, wherein said auxiliary information provides an indicator of one or more of an integrity of said security token, an operational parameter of said security token, and a randomly evolving key material of said security token.

16. An apparatus for embedding auxiliary information in authentication information transmitted to a receiver, the apparatus comprising:
a memory; and
at least one hardware device, coupled to the memory, operative to implement the following steps:
obtaining said auxiliary information;
mapping said auxiliary information to a codeword using a secret key, wherein said secret key is shared between a security token and an authentication authority, wherein said codeword comprises an error detection codeword defined by a codebook, wherein said error detection codeword has a minimum number of differing digits, d, with other error detection codewords defined by said codebook; and combining said codeword with a tokencode generated by said security token to generate a one-time passcode, wherein up to d−1 digit errors can be detected in said one-time passcode.

17. The apparatus of claim 16, further comprising the step of transmitting said one-time passcode to said receiver.

18. The apparatus of claim 16, wherein said tokencode is based on a forward secure pseudo random number.

19. The apparatus of claim 16, wherein said mapping step employs a mapping function that maps a given message in a message space to a given codeword in said codebook.

20. The apparatus of claim 19, wherein said codebook comprises an error-correction codeword having said minimum number of differing digits, d, with other error-correction codewords defined by said codebook.

21. The apparatus of claim 19, wherein said codebook is generated once for said security token using said secret key.

22. The apparatus of claim 19, wherein said codeword is generated for a given transmission using said secret key.

23. The apparatus of claim 22, wherein said secret key provides forward security.

24. The apparatus of claim 22, wherein said given message in a message space is mapped to a binary codeword in said codebook and said binary codeword is mapped to a decimal codeword in a decimal codebook using said shared secret key, wherein said decimal codebook comprises error-correction codewords of a same minimum number of differing digits, d, with other decimal codewords defined by said decimal codebook.

25. The apparatus of claim 16, wherein said combining step comprises an addition of said codeword and said tokencode to generate said one-time passcode.

26. The apparatus of claim 16, wherein said combining step comprises an embedding operation that operates over said codeword and said tokencode to generate said one-time passcode.

27. The apparatus of claim 16, wherein said combining step comprises a digitwise addition modulo 10 of said codeword and said tokencode.

28. The apparatus of claim 16, wherein said receiver comprises an authentication server.

29. The apparatus of claim 16, wherein said auxiliary information comprises a one-bit message indicating whether said security token has been attacked.

30. The apparatus of claim 16, wherein said auxiliary information provides an indicator of one or more of an integrity of said security token, an operational parameter of said security token, and a randomly evolving key material of said security token.

31. An article of manufacture for embedding auxiliary information in authentication information transmitted to a receiver, comprising a non-transitory machine readable recordable storage medium containing one or more programs which when executed implement the steps of:
obtaining said auxiliary information;
mapping said auxiliary information to a codeword using a secret key, wherein said secret key is shared between a security token and an authentication authority, wherein said codeword comprises an error detection codeword defined by a codebook, wherein said error detection codeword has a minimum number of differing digits, d, with other error detection codewords defined by said codebook; and combining said codeword with a tokencode generated by said security token to generate a one-time passcode, wherein up to d−1 digit errors can be detected in said one-time passcode.

* * * * *

UNITED STATES PATENT AND TRADEMARK OFFICE
CERTIFICATE OF CORRECTION

| | | |
|---|---|---|
| PATENT NO. | : 8,984,609 B1 | Page 1 of 1 |
| APPLICATION NO. | : 13/404780 | |
| DATED | : March 17, 2015 | |
| INVENTOR(S) | : Ari Juels et al. | |

It is certified that error appears in the above-identified patent and that said Letters Patent is hereby corrected as shown below:

Specification

Column 1, line 11, please add the following after "Verification,"" --(now United States Patent No. 9,118,661),--.

Column 4, line 37, replace "Numbers;" and/or" with --Numbers," (now United States Patent No. 9,008,303); and/or--.

Column 4, line 41, replace "SecurID™" with --SecurID®--.

Column 4, line 64, replace "SecurID" with --SecurID®--.

Column 5, line 11, replace "SecurID" with --SecurID®--.

Column 6, line 40, replace "Numbers;" and/or" with --Numbers," (now United States Patent No. 9,008,303); and/or--.

Column 10, lines 37 and 40, replace "SecurID" with --SecurID®--.

Column 13, line 2, replace "qual" with --equal--.

Signed and Sealed this
Fifth Day of April, 2016

Michelle K. Lee
*Director of the United States Patent and Trademark Office*